US006826194B1

United States Patent
Vered et al.

(10) Patent No.: US 6,826,194 B1
(45) Date of Patent: Nov. 30, 2004

(54) METHOD FOR SERVING IP USERS BY GRAPHICALLY-BASED INTERACTION TO AGENTS OF A CALL CENTER

(75) Inventors: Nimrod Itzhak Vered, Tel-Mond (IL); Nir Ganani, Azor (IL)

(73) Assignee: Tadiran Telecom Business Systems Ltd., Petach-Tikva (IL)

( * ) Notice: Subject to any disclaimer, the term of this patent is extended or adjusted under 35 U.S.C. 154(b) by 0 days.

(21) Appl. No.: 09/233,818

(22) Filed: Jan. 20, 1999

(51) Int. Cl.[7] .............................................. H04L 12/42
(52) U.S. Cl. ...................................................... 370/449
(58) Field of Search ................................ 370/352, 493, 370/494–495, 223, 202, 351, 401, 465, 468; 379/266.1, 265.01, 265.02, 265.03, 265.09, 265.11, 93.09, 210.01; 709/202–203, 224, 204–205, 206; 707/5, 4, 10; 705/14, 26; 345/705

(56) References Cited

U.S. PATENT DOCUMENTS

| | | | |
|---|---|---|---|
| 4,788,715 A | | 11/1988 | Lee |
| 5,703,943 A | | 12/1997 | Otto ........................ 379/265.11 |
| 5,802,526 A | | 9/1998 | Fawcett et al. .............. 707/104 |
| 6,061,347 A | * | 5/2000 | Hollatz et al. ............... 370/352 |
| 6,064,730 A | * | 5/2000 | Ginsberg ............... 379/265.09 |
| 6,094,673 A | * | 7/2000 | Dilip et al. .................. 709/202 |
| 6,144,991 A | * | 11/2000 | England ...................... 709/205 |
| 6,163,794 A | * | 12/2000 | Lange et al. ................. 709/202 |
| 6,272,537 B1 | * | 8/2001 | Kekic et al. ................. 709/223 |
| 6,298,356 B1 | * | 10/2001 | Jawahar et al. ............... 707/10 |
| 6,370,508 B2 | * | 4/2002 | Beck et al. .................. 709/224 |
| 6,385,191 B1 | * | 5/2002 | Coffman et al. ............. 370/352 |
| 6,449,260 B1 | * | 9/2002 | Sassin et al. ................ 370/270 |
| 6,460,029 B1 | * | 10/2002 | Fries et al. ...................... 707/4 |

* cited by examiner

Primary Examiner—Dang Ton
(74) Attorney, Agent, or Firm—Nath & Associates PLLC; Harold L. Novick

(57) ABSTRACT

Method and apparatus for connecting Internet or IP users to agents of a call center, which may be linked to an Internet web site. Visual information about quality of service, available agents, and history of previous connections, is transferred to the IP user via the IP network prior to voice call establishment, and a voice call is established according to inputs from the IP user which are responsive to the transferred information. An IP user who accesses a web site is identified and initiates a session with the serving call-center. Agent status information is stored at the call-center database. Information about the status and skills of each agent, which is stored at a database, is sent over the IP network and displayed on the screen of the IP user. A first selection menu is displayed on the screen and the IP user is requested to select between waiting for a preferred agent or sending voice or text messages. Available agents are displayed on the first menu, as well as their queuing time. If the IP user selects to wait, a second selection menu is displayed, thereby offering the IP user to continue to queue, or to queue for another agent, or to leave a voice message which may be delivered to the agent via voice mail. The IP user may send a text message which is displayed on the agent's display. After making all the desired selections and knowing the queuing time, a Voice-over-IP call between the IP user and the call-center may be established. The details of the connection between each IP user and his preferred agent during the current session are stored in a database.

21 Claims, 2 Drawing Sheets

METHOD FOR SERVING IP USERS BY GRAPHICALLY-BASED INTERACTION TO AGENTS OF A CALL CENTER

FIELD OF THE INVENTION

The present invention relates to the field of communications. More particularly, the invention relates to a method and apparatus for serving IP users by providing a vocal/graphical interface between the user and agents which are connected to a call center which is linked to an IP network.

BACKGROUND OF THE INVENTION

Several customer serving organizations provide services, such as information, and sales to customers by telephonic interaction, which reduces the operating costs, and enables the customer to be served efficiently, with no need to meet the vendor face-to-face. In practice, the interface between the customer and the vendor is provided by an "agent" (sometimes known as the customer service representative), which is a person, sitting in the vendor's call-center and answering the customer calls. Upon receiving a call from the customer, the call is routed to an available agent which serves the customer. Maximal customer service is achieved by reducing the customer waiting time, until an available agent is allocated to answer his incoming call. In some applications, agents are replaced by a voice answering system, which provides limited services to the customer. Incoming calls, entering a call-center are usually distributed to the agents of the call-center by an Automatic Call Distributor (ACD), which receives incoming calls and distributes them between a plurality of agents which are directly connected to the ACD by telephone lines.

Growing service requirements are associated with customers which are Internet Protocol (IP) users, such as Internet or Intranet users. By using the term "IP" it is meant to include any nework or any system, in which data packets are arranged and transferred according to the Internet Protocol (e.g., the Internet, an Intranet, a LAN, a WAN and others) or any other "packet switched network" and associated protocol including any network or any system, in which data is divided to packets of fixed or variable size and then transferred to its destination. These IP users access the vendor via his Web site, and are served by an answering system. Currently available answering systems, such as Interactive Voice Response (IVR) systems, offers the user several service menus, which are operated by selecting different features using a telephone keypad. The service is limited since information about the required services may be supplied to the system by a specific number of digits. Other systems, such as voice recognition systems, receive voice information from the user, which is processed and translated to desired operations. However, this service is also insufficient, since voice recognition is limited to a specified number of words, and suffers from errors and/or misunderstanding due to voice distortions and different accents. It is therefore desirable, to expand the range of available service features that may be provided to the IP user, by exploiting the graphical tools of the IP user.

In several systems, wherein interaction with a live agent is desired, selecting a specific agent to provide the desired service is sometimes preferred. U.S. Pat. No. 5,703,943 describes a system that serves telephonically connected (callers) users. The caller number is identified using Automatic Number Identification (ANI) and recorded with the preferred agent. Future calls from the same caller are automatically routed to the preferred agent whenever possible, and queued to any available agent if not. If a caller has not completed a transaction, that transaction number is assigned to the caller by the agent who is serving the call. That transaction and the next call are transferred to the same agent that previously handled the transaction.

U.S. Pat. No. 4,788,715 describes an ACD system that provides the caller audio information about the queuing time, prior to connection to an agent. The caller uses this information to defer the call to a later time if the queue is excessively long, to wait if the queue is short or to leave a message. The information is periodically updated so as to indicate a progress in the queue.

All the systems in these described patents are directed to serve telephonically connected users. These systems lack the capability to provide visual information about the current quality of service and available resources to IP users, prior to call establishment. Furthermore, the provided service does not fully exploit the available IP features and results in limited service.

All the methods described above have not yet provided satisfactory solutions to the problem of expanding the range of services for IP users.

It is an object of the present invention to provide a method and apparatus for expanding the range of services for IP users, which overcome the drawbacks of the prior art.

It is another object of the present invention to provide a method and apparatus for expanding the range of services for IP users, which provide the IP user visual information about the current quality of service and available resources, prior to call establishment.

It is a further object of the present invention to provide a method and apparatus for expanding the range of services for IP users, according to the history of contact with the IP user.

It is still another object of the present invention to provide a method and apparatus for expanding the range of services for IP users, according to the current status of agents who are preferred by the IP user.

Other objects and advantages of the invention will become apparent as the description proceeds.

SUMMARY OF THE INVENTION

The invention is directed to a method for connecting IP users, such as Internet users, to customer services representatives (agents). Agents are connected to a call center that may be linked to an IP network, such as an Internet web site. Visual information about quality of service, available resources, and history of previous connections, is transferred to the IP user via the IP network prior to voice call establishment, and a voice call is established according to inputs from the IP user which are responsive to the transferred information. A plurality of IP users are connected to an IP network, each via a suitable End User Equipment, such as a PC with a visual display screen. Each IP user has access to the home page or the web site of the call center via the IP network. The web site resides on a server which is connected to a call-center with a plurality of local agents that serve incoming calls from the IP users via a gateway (a device for converting data between two dissimilar protocols) and an ACD or a PBX with ACD features. An IP user who accesses a web site initiates a session by placing a request for a Voice Over IP (VoIP) call to the serving call-center. The server of the call-center identifies previously connected IP users, or generates a unique user ID for each first time user. Identification of IP users is carried out by a unique user information (user ID), such as the user name and an optional password. The user ID is stored in the ACD database and in the End User Equipment. Since the call-center comprises local agents, the status of each agent is available in real-time. This status information is stored at the call-center database.

Preferably, the call center consists of an ACD for routing incoming calls from IP users to agents, a gateway for converting data from IP to telephonic protocol and vice versa, a first database for storing information about the status/availability of each agent, a second database for storing information about previous contact between each IP user and agents, and a control circuitry for controlling transfer/storage of information and routing calls to agents. Preferably, if the IP user is a first time user, a unique ID is recorded for each first time IP user. This ID is further used as a log-in procedure. Preferably, only the second database may be required if the information about the availability of each agent is obtained by polling the agents.

Information about the status and skills of each agent, which is stored at the first database, is sent over the IP network and displayed on the screen of the IP user. A first selection menu is also displayed on the screen and the IP user is requested to select between waiting for a preferred agent or sending voice or text messages. Preferably, available agents are displayed on the first menu, as well as their queuing time. The selection of a preferred agent is received and information about the status of the preferred agent is retrieved from a first database and the queuing time to the preferred agent is continuously displayed until call establishment. If the IP user selects to wait, a second selection menu is displayed, thereby offering the IP user to continue to queue, or to queue for another agent, or to leave a voice message which may be delivered to the agent via voice mail. Preferably, the IP user may send a text message which is displayed on the agent's display. The IP user is connected to the queue to the preferred agent or a voice message for the preferred agent is recorded, according to the selection from the second menu, while continuing to display the queuing time. Finally, after making all the desired selections and knowing the queuing time, a Voice-over-IP call between the IP user and the call-center may be established. The details of the connection between each IP user and his preferred agent during the current session are stored in the second database.

Preferably, if the IP user is a previously connected user, information about previous connections with agents and skills of all agents is displayed together with a first selection menu on each IP user display screen. If the IP user does not wish to speak to a previous agent, he can select another agent.

Preferably, if the IP user is a previously connected user who wishes to be served by a previously connected agent, information about previous connections with agents is displayed to the IP user, together with a first selection menu, thereby offering the IP user to select a preferred previously connected agent. The queuing time to the preferred previously connected agent is displayed on the IP user display screen together with the first selection menu, and when the IP user makes a selection, the selection of the IP user is received. A second selection menu which offers the IP user the option of leaving a message, selecting another agent, going back to the main screen or continuing to wait in the queue is then shown to the user. Unless one of the other choices are taken, the user remains in the queue to the preferred agent. Preferably, visual information, such as promotions, may be displayed while queuing. In the event that the IP user at any time decided that the queue is too long, the user is offered the option to either leave a message to the preferred agent or choose another agent. The message to be left for the preferred agent may be a text or a voice message. The details of the connection between each IP user and his preferred previously connected agent for the current session are also stored in the second database.

The invention is also directed to an apparatus for IP user—customer representative connection. The apparatus, comprises circuitry for the transfer of visual information about the current quality of service, the available resources, and history of previous connections to the IP user, prior to call establishment, and circuitry for establishing a call according to inputs from the IP user which are responsive to the information.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

Figure 1:
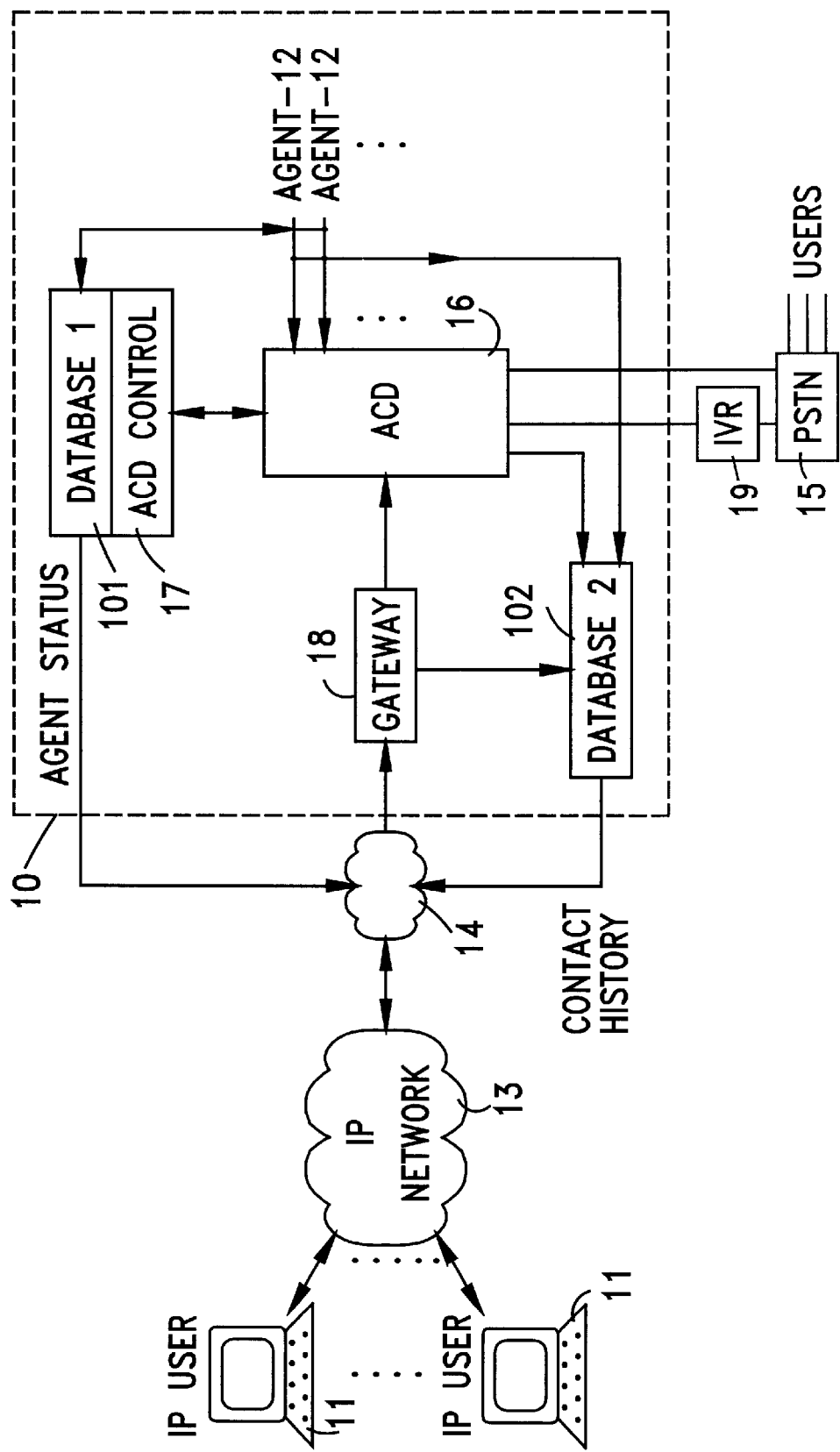
FIG. 1 is a block diagram of a call center which provides an expanded range of services to a plurality of IP users which are connected to the call center via an IP network, according to a preferred embodiment of the invention.

FIG. 1 is a block diagram of a call center 10 which provides an expanded range of services to a plurality of IP users (such as Internet or Intranet users) which are connected to the call center, according to a preferred embodiment of the invention. Service is based on a plurality of IP users 11, and a plurality of local agents 12, serving the users, and on an IP connection between the plurality of local agents 12, and a plurality of IP users 11, via an IP network 13. An IP user 11 accesses a Web server 14 which displays a web site to the user and is linked to a call center 10. The call center 10 comprises an ACD 16, an ACD control circuit 17, a gateway 18 and two databases, 101 and 102.

Since IP users are connected via End User Equipment, such as a PC, and transmit data packets, therefore, in order to speak to an agent, the data is first converted from an IP to analog signals by the gateway 18, as is well known in the industry and manufactured by companies such as Vocaltec and Netspeak Corporation, which is actually a protocol converter, serving as an interface between IP and telephonic environment. The plurality of local agents 12, are continuously connected to the ACD 16. Hence, on-line information about the status of each local agent is provided to the ACD 16.

Alternatively, the ACD 16 may be replaced by a Private Branch Exchange (PBX) which comprises ACD features. In addition, the call center 10 may serve additional telephonically connected users, via a direct connection between the ACD 16 and a PSTN 15, or a connection via an IVR system 19.

The first database 101, which is connected to each agent, is used to continuously store and update the status of each agent. According to a preferred embodiment of the invention, upon receiving a call from an IP user 11, the ACD control circuit 17 updates the web server 14, with information about the status of each agent in the first database 101, and displays screen information about all agents logged into the call center 10. This information comprises agent identification (name or number), agent skills and/or classifications, agent current status and expected waiting time for each agent who is busy. It is to be understood that by the word "agent" we may refer to an individual agent or to a group of agents with specific skills. The IP user 11 then selects a preferred agent, while information about agents of the ACD is periodically updated after a predetermined time, and may be displayed at the web site 14. Finally, after providing updated information to the IP user, the ACD 16 establishes the connection between the IP user and the selected agent, if the selected agent is available, via gateway 18. Alternatively, real time information about the availability and the status of agents may be extracted by polling the agents continuously or upon request, without the need to save the information in the first data base.

According to a preferred embodiment of the invention, voice connection may be established using a Voice-over-IP, if such Voice-over-IP software is installed at the IP user's computer. Alternatively, a Voice-over-IP software may be downloaded into the IP user's computer via the IP network. Such software may be, for instance, an applet (a small Java program which is embedded into an Hyper Text Markup Language (i.e., the coding language used to create hypertext documents for use on the IP network) page, and can only make an IP connection to the computer from which the applet was sent).

Several features are offered to the IP user whenever the preferred agent is not available. First, the IP user can queue to the preferred agent according the expected waiting time which is displayed. During the waiting time, the IP user is continuously updated about his progress in the queue to the preferred agent via the displayed screen. Second, the IP user may leave a voice or text message for the preferred agent if the expected waiting time for this agent is too long. The voice message may comprise instructions to the preferred agent an/or a request to call the IP user back at more convenient time. If no preferred agent is requested, the voice message may be addressed to the next available agent which may call the IP user back.

According to a preferred embodiment of the invention, the history of the connection with each specific IP user is stored in a second data base 102, which is also connected to each agent. The details of each session of a specific IP user with the call center is recorded and stored in the second data base 102, and partially displayed to the IP user. The full stored information is made available to the agent when a connection is established. This stored information may comprise details (name, skills etc.) of the agent who previously handled a specific request, details of previous transactions, details of uncompleted transactions, dates, financial data etc. Of these, the IP user will be shown the name and skills of the last agent he was connected to, as well as the data and time of the connection, which helps the IP user to select an agent for the current session. The stored information may also be used to control the selection of agents offered to the user. For instance, in case when the IP user wishes to complete an uncompleted transaction, the name of the agent who previously handled the transaction appears on the screen, as well as the date of the completed transaction. On the other hand, if the IP user was not satisfied from the previous service of a specific agent, he may use the information to select another agent.

Figure 2:
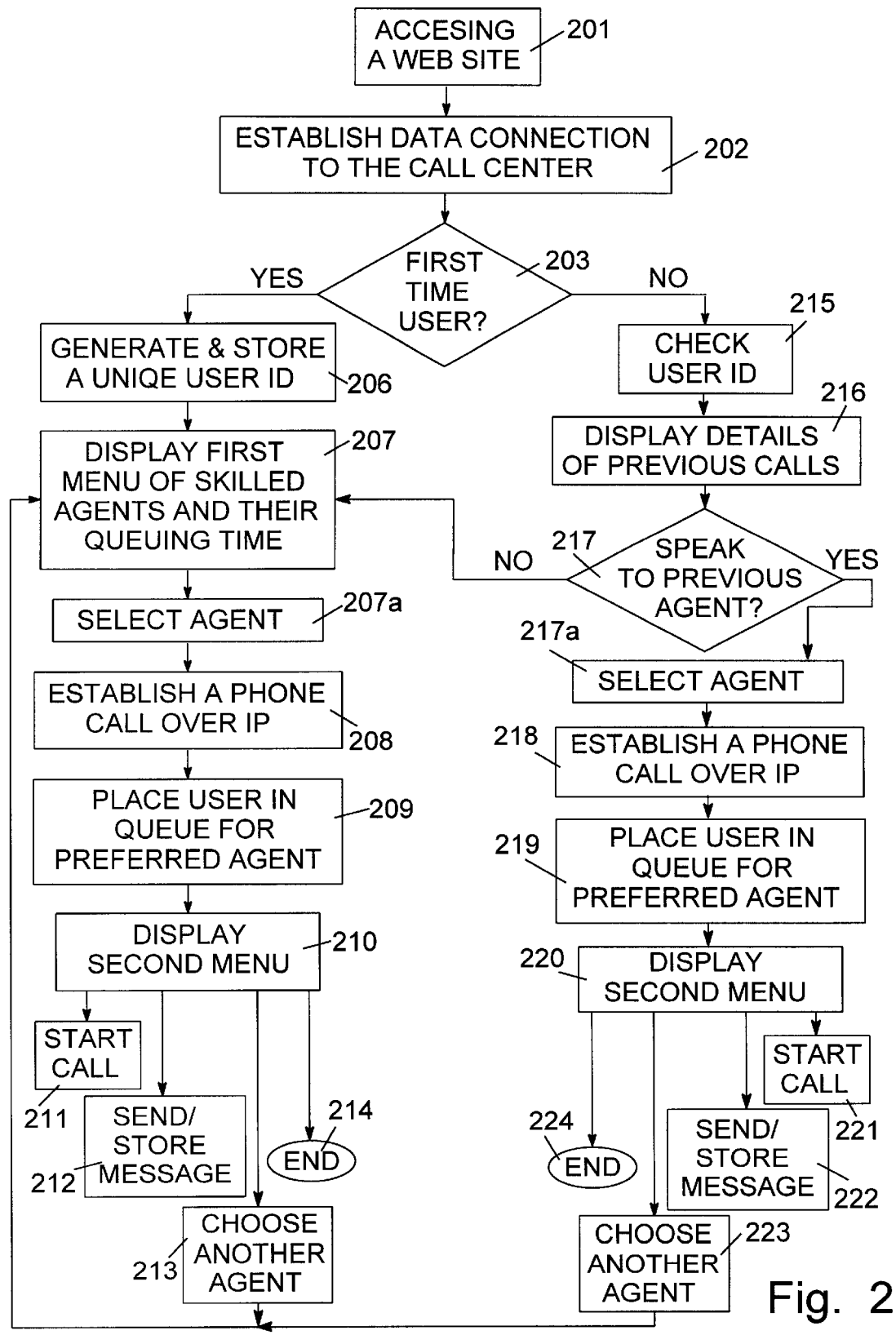
FIG. 2 is a flow chart of the operations used for serving IP users who wish to access a call center which is linked to an IP network, according to a preferred embodiment of the invention.

FIG. 2 is a flow chart of the operations used for serving a first time or previously connected IP user, who wishes to access a call center which is linked to an IP network, according to a preferred embodiment of the invention. At the first step 201, an IP user 11 accesses the home page of a call-center which resides on server 14. Data connection channel between the server 14 and the call center is established at the next step 202, so as to enable data transfer between the IP user and the call center (in both directions) whenever it is desired for updating the IP user about the agent status and/or receiving instruction/selections from the IP user. At the next step 203, the call center 10 to which the IP user wishes to be connected identifies whether the current IP user is a first time previously connected IP user, by checking if a unique ID (e.g., the user name and an optional password) is stored in the End User Equipment of the IP user. If the IP user is a first time user, at the next step 206, a unique user Identification Data (ID) for the new IP user is generated and stored at the server 14 of the: web site. First time users might be required to enter more details to be available for future assistance (e.g., help in the event of forgotten password, etc.). This unique user ID is sent back and stored also at the computer of the IP user. The ID information may be used later when the same specific IP user reconnects the same web site for further services. Among other items of information, the user's equipment is confirmed to be capable of handling VOIP. If not, only text messages will be authorized, and all other items will be masked. After the new IP user is identified, at the next step 207 information about the agents which are connected to the call center is transferred to the computer of the new IP user and displayed as a first selection menu on his screen. According to a preferred embodiment of the invention, this information may comprise agent identification, such as, name or number, skills of each agent and the expected queuing time to each agent. The display screen comprises a menu of selection boxes, from which the new IP user can select a preferred agent to which he wishes to be connected, according to the desired services during the current session. Current waiting time information for the preferred agent and other available agents or groups of agents is displayed. According a preferred embodiment of the invention, a preferred agent may represent a group of agents, in which each agent has essentially the same skills. In this case, the whole group will be displayed for selection. Alternatively, the group of agents may comprise agents with different skills who may still provide the IP user the desired quality of service. The displayed information may also vary according to predetermined decisions of the call-center manager.

At the next step 207a, the IP user makes the selection of the preferred agent. At the next step 208, a Voice-over IP telephonic connection is established between the IP user and the ACD. The user's computer is searched for a compatible VoIP software, and if such software is found, it is utilized. If not, a VoIP software applet is first downloaded. At the next step 209, the ACD places the call in the queue for the selected agent, and additional information may be displayed during the queuing period. While waiting in the queue, at the next step 210 a second selection menu is displayed, and the IP user is requested to decide whether he wishes to leave a message for the selected agent, to select another agent, or to terminate the current session and try to reconnect to the preferred agent later, or by inaction to maintain his position in the queue. Promotional material may also be displayed to the IP user. If the IP user wishes to wait to speak to an agent (preferred or another), the ACD transfers the call to the selected agent (preferred or another) and Voice-over IP call is started at the next step 211 using the VoIP previously found or installed, as soon as the selected agent becomes available, or promptly if the selected agent is available. According to a preferred embodiment of the invention, a plurality of IP users who are connected to the same call-center and wish to be served by different agent of the call center, may be simultaneously connected to agents of the call-center by web site sharing. The server of the call-center may handle a plurality of IP user calls, which are queued to different agents of the call center.

While the IP user is waiting, three additional selections are offered to the IP user by displaying the second selection menu at step 210, from which one may be selected: to leave a message, to select another agent or to terminate the current connection. If the first selection is preferred, at step 212, a voice or text message for the preferred agent is recorded and stored for further recitation, when the preferred agent is available. Optionally, the text message may be directly sent to the preferred agent (by popping into his screen display), or may be saved to be read later on by the preferred agent. The preferred agent may call the IP user back if necessary, according to the contents of the left message. If the second selection is preferred, the option to talk to another agent is selected at step 213 and the first menu is displayed again by going back to step 207. If the third selection is preferred, i.e., the IP user wishes to terminate the current connection, the user makes this selection and the connection is terminated at step 214. The user may also maintain his position in the queue by inaction.

If the IP user is not a first time user, at the next step 215 the ID information of the previously connected user is checked and verified. At the next step 216, details of the last or any previous call, which are stored at the database of the call center are displayed together with the first selection menu on the IP user screen. The IP user is updated about the content of the previous calls and the identification of the specific agent(s) who previously handled the previous calls. This feature is of great importance in the case when a transaction is not completed during a session. In this case, the IP user may select the same agent to complete the transaction. In other cases, an IP user may be satisfied from the service of a specific agent, and this agent is preferred also for further services. Thus, at the next step 217, the IP user is requested to select between the option to be served by a previously connected (known) agent or to be served by another agent. The queuing time for this agent, and for all available choices is displayed. If no previously connected (known) agent is preferred, steps 207 to 214 are repeated. If a previously connected (known) agent is preferred, at the next step 217a the preferred agent is selected. At the next step 218, a Voice-over IP telephonic connection is established between the IP user and the ACD. At the next step 219, the ACD places the call in the queue for the selected agent, and additional information may be displayed during the queuing period.

While waiting in the queue, at the next step 220 a second selection menu is displayed, and the IP user is requested to decide whether he wishes to leave a message for the selected agent, to select another agent, or to terminate the current session and try to reconnect to the preferred agent later, or by inaction, to maintain his position in the queue. If the IP user wishes to wa it to speak to an agent (preferred or another), the ACD transfers the call to the selected agent (preferred or another) and Voice-over IP call is started at the next step 221 using the VoIP previously found or installed, as soon as the selected agent becomes available, or promptly if the selected agent is available.

While the IP user is waiting, three additional selections are offered to the IP user by displaying the second selection menu at step 220, from which one may be selected: to leave a message, to select another agent or to terminate the current connection. If the first selection is preferred, at step 222, a voice or text message for the preferred agent is recorded and stored for further recitation, when the preferred agent is available. Optionally, the text message may be directly sent to the preferred agent (by popping into his screen display), or may be saved to be read later on by the preferred agent. The preferred agent may call the IP user back if necessary, according to the contents of the left message. If the second selection is preferred, the option to talk to another agent is selected at step 223 and the first menu is displayed again by going back to step 207. If the third selection is preferred, i.e., the IP user wishes to terminate the current connection, the user makes this selection and the connection is terminated at step 224. The user may also maintain his position in the queue by inaction.

The above examples and description have of course been provided only for the purpose of illustrations, and are not intended to limit the invention in any way. As will be appreciated by the skilled person, the invention can be carried out in a great variety of ways, employing more than one technique from those described above, employing only one database, leaving messages to agents who are not logged-in or not currently available, all without exceeding the scope of the invention.

What is claimed is:

1. A method for connecting IP users to human agents of a call-center, the human agents being customer service representative, comprising:

transferring to at least one of the IP users, prior to call establishment, real-time visual information including at least one of:
  details of previous connections between that at least one of the IP users and the human agents;
  current quality of service;
  available resources; and
  agents' details;
displaying visual information about said details of previous connections when an access to the call center by an IP user is determined;
receiving inputs from at least one of the IP users which are responsive to said information,
allowing said IP user to select an agent for connection, or to leave a message for an agent; and
establishing a call between the at least one of the IP users and a human agent according to said received inputs,
wherein the availability of each agent is obtained by polling the agents.

2. A method for connecting IP users to human agents of a call-center, the human agents being customer service representative, comprising:

transferring to at least one of the IP users, prior to call establishment, real-time visual information including at least one of:
  details of previous connections between that at least one of the IP users and the human agents;
  current quality of service;
  available resources; and
  agents' details;
displaying visual information about said details of previous connections when an access to the call center by an IP user is determined;
receiving inputs from at least one of the IP users which are responsive to said information;

allowing said IP user to select an agent for connection, or to leave a message for an agent; and establishing a call between the at least one of the IP users and a human agent according to said received inputs;

wherein the display of visual information to said IP user, comprises performing the followings steps:

a) displaying a first selection menu on the screen display of said IP user, said first selection menu introducing the skills, availability, queuing time for each available agent/group of agents and details of previous connections with each agent, and offering said IP user to select, and wait to, a preferred available agent/group of agents, or to leave a message to a preferred agent/group of agents;

b) while waiting in the queue for a preferred agent/group of agents, displaying at least a second selection menu on the screen display of said IP user, said at least second selection menu offering said IP user a plurality of selectable choices.

3. A method according to claim 2, wherein said at least second selection menu further allows said IP user to select and wait for another available agent/group of agents, or to leave a text message to said preferred agent/group of agents, or to quit waiting while leaving a message to said preferred agent/group of agents.

4. A method for connecting IP users to human agents of a call-center, the human agents being customer service representative, comprising:

transferring to at least one of the IP users, prior to call establishment, real-time visual information including at least one of:
  details of previous connections between that at least one of the IP users and the human agents;
  current quality of service;
  available resources; and
  agents' details;

displaying visual information about said details of previous connections when an access to the call center by an IP user is determined;

receiving inputs from at least one of the IP users which are responsive to said information;

allowing said IP user to select an agent for connection, or to leave a message for an agent; and establishing a call between the at least one of the IP users and a human agent according to said received inputs while displaying details of said IP user to said human agent, or delivering a message to said agent or to another agent, in response to said IP user selection;

wherein establishing the call between an IP user and an agent comprises performing the following steps:

a) establishing a data connection between the IP user and the call-center;

b) generating and storing a unique user ID for each first time IP user or verifying the user ID of each previously connected IP user;

c) receiving a selection of an available agent from the IP user;

d) placing a request related to said IP user in a queue for said selected agent; and e) starting a VOIP call between said IP user and said selected available agent or an agent from said group of agents, as soon as said selected agent or group of agents becomes available, if said request related to said IP user still remains in the queue.

5. A method for connecting IP users to human agents of a call-center, the human agents being customer service representative, comprising:

transferring to at least one of the IP users, prior to call establishment, real-time visual information including at least one of:
  details of previous connections between that at least one of the IP users and the human agents;
  current quality of service;
  available resources; and
  agents' details;

displaying visual information about said details of previous connections when an access to the call center by an IP user is determined;

receiving inputs from at least one of the IP users which are responsive to said information;

allowing said IP user to select an agent for connection, or to leave a message for an agent; and establishing a call between the at least one of the IP users and a human agent according to said received inputs;

wherein transferring details of previous connections comprises performing the following steps:

a) for each established call between said IP user and a selected agent, storing a user ID and details of said selected agent in a corresponding database in said call-center;

b) retrieving said stored details of said selected agent from said corresponding database in said call-center, displaying said details and skills of previously connected agents to said IP user, and allowing said IP user to select a previously connected agent, prior to any call establishment between said IP user and said call-center; and c) retrieving said stored user ID from said corresponding database in said call-center, and displaying the user ID to each agent, prior to any call establishment between said IP user and said call-center.

6. A method for connecting IP users to human agents of a call-center, the human agents being customer service representative, comprising:

transferring to at least one of the IP users, prior to call establishment, real-time visual information including at least one of:
  details of previous connections between that at least one of the IP users and the human agents;
  current quality of service;
  available resources; and
  agents' details;

receiving inputs from at least one of the IP users which are responsive to said information; and establishing a call between the at least one of the IP users and a human agent according to said received inputs, comprising:

a) providing a connection to a plurality of IP users, at least one IP user being connected to an IP network via a suitable computer having a visual display screen;

b) providing a call-center, said call-center having a plurality of agents for serving incoming calls from said IP users, and a first and second databases for storing and retrieving information;

c) providing at least one web site, said web site being accessible to said plurality of IP users via said IP network, and linked to said call-center via a suitable IP link;

d) allowing access to the web site by at least one IP user;

e) establishing a data connection between said IP user and said call-center;
f) identifying previously connected IP users by their corresponding user ID or generating a unique user ID for each user whenever the IP user is a first time user;
g) continuously storing information related to a status of each agent in said first database;
h) in case when the IP user is a first time user, performing the followings steps:
 h.1) generating and storing a unique user ID;
 h.2) displaying a first selection menu on each IP user display screen, said first selection menu containing information about all agents and their corresponding queuing time, retrieved from said first database or obtained by polling said agents, and allowing said IP user the capability of selecting a preferred agent and waiting in queue for said preferred agent, or sending a message to said preferred agent;
 h.3) receiving the preferred agent selection from the IP user;
 h.4) establishing a Voice-over-IP session between the IP user and the call-center;
 h.5) displaying a second selection menu on the IP user display screen while waiting in queue for said preferred agent, said second selection menu allowing said IP user to leave a message to said preferred agent or to talk to another agent or to terminate said call;
 h.6) connecting the IP user to the queue associated with said preferred agent or recording a voice or text message for method for connecting IP users to human agents of a call-center, the human agents being customer service representative, comprising:
 transferring to at least one of the IP users, prior to call establishment, real-time visual information including at least one of;
 details of previous connections between that at least one of the IP users and the human agents;
 current quality of service;
 available resources; and
 agents' details;
 receiving inputs from at least one of the IP users which are responsive to said information; and
 establishing a call between the at least one of the IP users and a human agent according to said preferred agent, according to the selection of step h.5) above; and
 h.7) storing the details of the connection between each IP user and his preferred agent for the current session in said second database.

7. A received inputs, comprising:
a) providing a connection to a plurality of IP users, at least one IP user being connected to an IP network via a suitable computer having a visual display screen;
b) providing a call-center, said call-center having a plurality of agents for serving incoming calls from said IP users, and a first and second databases for storing and retrieving information;
c) providing at least one web site, said web site being accessible to said plurality of IP users via said IP network, and linked to said call-center via a suitable IP link;
d) allowing access to the web site by at least one IP user;
e) establishing a data connection between said IP user and said call-center;
f) identifying previously connected IP users by their corresponding user ID or generating a unique user ID for each user whenever the IP user is a first time user;
g) continuously storing information related to a status of each agent in said first database;
h) in case when the IP user is a previously connected user, performing the following steps:
 h.1) verifying the user ID;
 h.2) displaying information about previous connections with agents;
 h.3) displaying information about all agents and a first selection menu on each IP user display screen, said first selection menu containing information about all agents and their corresponding queuing time, retrieved from said first database or obtained by polling said agents, and allowing said IP user the capability for selecting a preferred agent and waiting in queue for said preferred agent, or sending a message to said preferred agent;
 h.4) receiving the preferred agent selection from the IP user;
 h.5) establishing a Voice-over-IP session between the IP user and the call-center;
 h.6) regularly retrieving information about said preferred agent from said first database and displaying the updated queuing time to said preferred agent and a second selection menu on the IP user display screen, said second selection menu allowing said IP user to queue or to leave a voice message to said preferred agent;
 h.7) connecting the IP user to the queue for said preferred agent or recording a voice or text message for said preferred agent, according to the selection of step h.6) above; and
 h.8) storing the detail of the connection between each IP user and his preferred agent for the current session in said second database.

8. A method according to claim 6, wherein the IP user is a previously connected user who wishes to be served by an agent to whom said IP user was previously connected, comprising performing the following steps:
 h-I) displaying information about previous connections with agents and a first selection menu on each IP user display screen, said first selection menu allowing said IP user a capability to select a preferred agent to whom said IP user was previously connected;
 h-II) receiving information about the selection of said preferred agent from the IP user;
 h-III) establishing a Voice-over-IP session between the IP user and the call-center;
 h.IV) displaying the queuing time to said preferred agent and a second selection menu on the IP user display screen, said second selection menu offering said IP user to stay in the queue for said preferred connected agent, to queue for another agent or group of agents, or to leave a message;
 h.V) connecting the IP user to said preferred agent when available, or displaying the queuing time to said preferred agent and said second selection menu on the IP user display screen; and
 h.VI) storing the details of the connection between each IP user and the preferred agent for the current session in said second database.

9. A method for connecting IP users to human agents of a call-center, the human agents being customer service representative, comprising:
 transferring to at least one of the IP users, prior to call establishment, real-time visual information including at least one of:

details of previous connections between that at least one of the IP users and the human agents;
current quality of service;
available resources; and
agents' details,
receiving inputs from at least one of the IP users which are responsive to said information; and
establishing a call between the at least one of the IP users and a human agent according to said received inputs;
wherein the IP user wishes to be served by a preferred agent who is not currently logged into the call-center, comprising performing the followings steps:
a) sending a voice or text message to said preferred agent, said message being stored and retrieved later on by said preferred agent; and
b) selecting another agent from a first selection menu in the event that said IP user is willing to be served by any available agent.

10. A method according to claim 6, wherein the IP user and the IP network are an Internet user and the Internet, respectively.

11. A method according to claim 6, wherein the IP user and the IP network are an Internet user and an Internet, respectively, said Intranet being linked to the Internet.

12. Apparatus for connecting IP users to human agents of a call-center, the human agents being customer services representatives, comprising:
circuitry for the transfer to at least one of the IP users, prior to call establishment, of real time visual information including at least one of:
the history of previous connections between that at least one of the IP users and the human agents;
current quality of service;
available resources; and
agents' details;
and for receiving, from the at least one of the IP users, prior to call establishment, inputs which are responsive to said information; and
circuitry for establishing a call between the at least one of the IP users and a human agent according to said received inputs, comprising:
a) a database, linked to a web site and to each agent of said call-center for storing information about each IP user, being connected to said call center, details of said connections and skills of each agent/group of agents;
b) a software, embedded into said call-center, being capable of updating and retrieving information from said database, and displaying information on the screen displays of said IP users and said agents, prior to call establishment;
c) circuitry for identifying each IP user;
d) circuitry for displaying visual information on said IP user screen display;
e) circuitry for delivering and storing message to each agent;
f) circuitry for establishing a call between said IP user and a selected agent; and
g) circuitry for storing and updating information in said database.

13. Apparatus according to claim 12, further comprising an additional database, linked to said web site and to each agent of said call-center for storing and updating information about the availability of each agent.

14. Apparatus according to claim 12, further comprising:
i) plurality of IP user stations having a visual display screen, at least one IP user station being suitable to connect to an IP network;
ii) a call-center, said call-center having a plurality of agent stations for serving incoming calls from said IP users, and a first and second databases for storing and retrieving information; and
iii) at least one web site, said web site being accessible to said plurality of IP user stations via said IP network, and linked to said call-center via a suitable IP link.

15. Apparatus according to claim 12, wherein the web site comprises:
h) circuitry for identifying previously connected IP users; and
i) circuitry for generating a unique user ID for each user whenever the IP user is a first time user.

16. Apparatus for connecting IP users to human agents of a call-center, the human agents being customer services representatives, comprising:
circuitry for the transfer to at least one of the IP users, prior to call establishment, of real time visual information including at least one of:
the history of previous connections between that at least one of the IP users and the human agents;
current quality of service;
available resources; and
agents' details;
and for receiving, from the at least one of the IP users, prior to call establishment, inputs which are responsive to said information; and
circuitry for establishing a call between the at least one of the IP users and a human agent according to said received inputs;
wherein the call-center comprises:
a) a first database for storing information about each agent status;
b) a second database for storing information about previous connections between each IP user and agents;
c) an Automatic Call Distributor (ACD), the outputs of said ACD being telephonically connected to a plurality of local agents, the input of said ACD being telephonically connected to a plurality of IP users via a web site of an IP network and a gateway, said gateway being connected to said second database;
d) a control circuit for controlling information storage/retrieval in/from said first and second databases;
e) a gateway for protocol conversion from IP to a standard telephonic protocol; and
f) circuitry for recording a voice message for each agent.

17. Apparatus according to claim 12, wherein calls are distributed between agents by a PBX having ACD features.

18. Apparatus according to claim 12, wherein the voice messages are sent to agents via voice mail.

19. Apparatus according to claim 12, wherein the message is a text message displayed on the agent's screen.

20. Apparatus according to claim 12, wherein the IP user is an Internet user connected via the Internet.

21. Apparatus according to claim 12, wherein the IP user is an Internet user connected via an Intranet, said Intranet being linked to the Internet.

* * * * *